US010280895B1

(12) United States Patent
Keeley

(10) Patent No.: US 10,280,895 B1
(45) Date of Patent: May 7, 2019

(54) FLUID TURBINE SEMI-ANNULAR DELTA-AIRFOIL AND ASSOCIATED ROTOR BLADE DUAL-WINGLET DESIGN

(71) Applicant: William Scott Keeley, Charlestown, RI (US)

(72) Inventor: William Scott Keeley, Charlestown, RI (US)

( * ) Notice: Subject to any disclaimer, the term of this patent is extended or adjusted under 35 U.S.C. 154(b) by 0 days.

(21) Appl. No.: 16/232,015

(22) Filed: Dec. 25, 2018

Related U.S. Application Data

(63) Continuation-in-part of application No. 15/365,648, filed on Nov. 30, 2016, now Pat. No. 10,202,961.

(51) Int. Cl.
*F03D 1/04* (2006.01)
*F03D 1/06* (2006.01)

(52) U.S. Cl.
CPC .............. *F03D 1/04* (2013.01); *F03D 1/0633* (2013.01); *F05B 2240/30* (2013.01)

(58) Field of Classification Search
CPC ........ F03D 1/04; F03D 1/0633; F03D 1/0641; F05B 2240/221; F05B 2240/30
See application file for complete search history.

(56) References Cited

U.S. PATENT DOCUMENTS

| 2010/0166556 A1* | 7/2010 | Kirtley | ...................... F03D 1/06 416/179 |
|---|---|---|---|
| 2012/0141250 A1* | 6/2012 | Kinzie | ...................... F03D 1/04 415/1 |
| 2013/0015666 A1* | 1/2013 | Wilson | ...................... F03D 1/04 290/55 |
| 2013/0309081 A1* | 11/2013 | Hjort | ........................ F03D 1/04 415/211.2 |

* cited by examiner

*Primary Examiner* — Ryan A Reis
(74) *Attorney, Agent, or Firm* — Keeley DeAngelo LLP; W Scott Keeley

(57) ABSTRACT

A semi-annular delta-airfoil is designed in conjunction with a fluid turbine rotor blade to provide increased rotor-tip speed, increased coefficient of power, reduced wind shear, reduced noise and increased self-yaw. A dual-winglet rotor blade in combination with a semi-annular delta-airfoil increases the above mentioned benefits by increasing the rotor-blade tip surface-area that is in contact with the area of increased fluid velocity over the semi-annular airfoil. Winglets on the semi-annular delta-airfoil provide self-yaw characteristics.

5 Claims, 7 Drawing Sheets

FLUID TURBINE SEMI-ANNULAR DELTA-AIRFOIL AND ASSOCIATED ROTOR BLADE DUAL-WINGLET DESIGN

CONTINUATION IN PART

This application is a continuation-in-part application number of U.S. patent application Ser. No. 15/365,648.

TECHNICAL FIELD

The present disclosure relates to shrouded and ducted fluid turbines and to fluid turbine rotor blade design.

BACKGROUND

In general, horizontal-axis fluid-turbine rotor blades comprise two to five blades arranged evenly about a central axis and coupled to an electrical generation machine.

Generally speaking, a fluid turbine structure with an open unshrouded rotor design, captures energy from a fluid stream that is smaller in diameter than the turbine's rotor. In an open unshrouded fluid turbine, as fluid flows from the upstream side of the rotor to the downstream side, the average axial fluid velocity remains constant as the flow passes through the rotor plane. Energy is extracted at the rotor, resulting in a pressure drop on the downstream side of the rotor. The fluid directly downstream of the rotor consists of air that exists at sub-atmospheric pressure due to the energy extraction. The fluid directly upstream of the rotor consists of air that exists at greater-than-atmospheric pressure. The high-pressure upstream of the rotor deflects some of the upstream air around the rotor. In other words, a portion of the fluid stream is diverted around the open rotor as if by an impediment. As the fluid stream is diverted around the open rotor, it expands. This is referred to as flow expansion at the rotor. Because of the flow expansion, the upstream area of the columnar fluid stream, that may be captured by the open rotor turbine, is smaller than the area of the rotor.

The Betz limit calculates the maximum power that can be extracted by an open rotor turbine, from a volume of moving fluid. The Betz limit is derived from fluid dynamic control-volume theory for flow passing through an open rotor. According to the Betz limit, and independent of the design of the fluid turbine, a maximum of 16/27 of the total kinetic energy in a volume of moving fluid can be captured by an open-rotor turbine. Conventional turbines commonly produce 75% to 80% of the Betz limit, or about 44% of the total kinetic energy in a volume of moving fluid.

A fluid turbine power coefficient (Cp) is the power generated over the ideal power available by extracting all the wind kinetic energy approaching the rotor area. The Betz power coefficient of 16/27 is the maximum power generation possible based on the kinetic energy of the flow approaching a rotor swept area. For an open-rotor turbine, the rotor swept area used in the Betz Cp derivation is the system's maximum flow area described by the diameter of the rotor blades. The maximum power generation occurs when the rotor flow velocity is the average of the upstream and downstream velocity. This is the only rotor velocity that allows the flow-field to be reversible, and the power extraction to be maximized. At this operating point, the rotor velocity is 2/3 the wind velocity, the wake velocity is 1/3 the wind velocity, and the rotor flow has a non-dimensional pressure coefficient of −1/3 at the rotor exit. The −1/3 pressure coefficient is a result of the rotor wake flow expanding out to twice the rotor exit area downstream of the rotor station.

Induced drag is generated by a rotor blade due to the redirection of fluid during the generation of lift as a column of fluid flows through the rotor plane. The redirection of the fluid may include span-wise flow along the pressure side of the rotor blade along a radial direction toward the blade tip where the fluid then flows over to the opposite side of the blade. The fluid flow over the blade tips joins a chord-wise flow, otherwise referred to as bypass flow, forming rotor-tip vortices. The rotor-tip vortices mix with vortices shed from the trailing edge of the rotor blade to form rotor wake.

It is commonly known that rotor wake affects rotor intake. A column of fluid encounters a rotor as an impediment, in part, because a portion of the fluid flowing around the rotor expands in the wake of the rotor in a form referred to as the stream column. Fluid flowing around the rotor plane is referred to as the bypass flow. Bypass flow passes over the outer surface of the stream column. Increasing lift over the rotor, and hence increasing the amount of energy extracted from the stream column, creates slower-moving flow in the rotor wake, impeding flow through the rotor. This impediment increases the volume of the rotor wake. In other words, as more power is extracted at the rotor, the rotor stream column will expand and more fluid flow will bypass the rotor. If a significant amount of energy is extracted, most of the fluid flow will bypass the rotor and the rotor can effectively stop extracting energy. This is referred to as rotor stall. As a result, maximum power is achieved from the two opposing effects of increased power extraction resulting in relatively lower flow rates; and reduced power extraction resulting in relatively higher flow rates.

When a shrouded turbine is used for increased power extraction, in general, it extracts more power from the fluid stream than an open rotor by increasing the mass flow through the rotor plane, employing specially designed rotor blades to extract more power than their open-rotor turbine counterpart, and then by dissipating the wake to avoid diffuser stall. Diffuser stall occurs when the increased mass flow through the rotor encounters the ambient fluid stream down-stream of the rotor plane and causes a back-pressure at the rotor plane. Proposed solutions to diffuser stall include increasing the size of the wake area to allow for increased wake expansion and injecting high-energy fluid into the rotor wake. Both solutions have been proven to allow for rotor blade design that results in increased energy extraction at the rotor.

Turbines in the power production range of 1 kW or less often have tail fins for yawing the turbine into the wind. A tail fin causes turbulence in the wake back pressure in the rotor plane, thus causing a reduction in mass flow through the rotor and hence a reduction in power production.

Aside from the aerodynamic challenge of eliminating the causes of diffuser stall, shrouded turbines are heavier than their open rotor counterparts; they are more expensive to produce and construct; and they create a bluff body when hit by commonly occurring side winds and gusts. Side winds produce a large amount of drag force that places considerable strain on structural components.

Wind shear is the difference in wind speed by height. The higher the wind shear, the higher the wind velocity at the upper region of a rotor plane compared with the wind velocity at the lower regions of the rotor plane. As turbines increase in scale, they take advantage of higher wind velocities at higher altitudes while also experiencing greater wind shear. Extreme wind shear is responsible for noise emissions that do not meet noise-pollution regulations.

Stress and strain on rotor blades is a considerable concern in the wind turbine industry. A rotor blade rotating in a high wind-shear environment will experience variation in wind velocities and therefore more down-wind flexing while passing through the upper regions of the rotor plane than while passing through the lower regions of the rotor plane. Wind-shear increases as turbines increase in size.

Noise caused by wind turbines is a product of wind velocity and rotor blade trailing-edge vortices and tip vortices. Trailing-edge and tip vortices create white-noise.

Tower signature is a term often used to describe the sound created when rotor tip vortices encounter the turbine tower. The tower interrupts the flow of the trailing-edge and tip vortices, occurring as each blade passes the tower. This sound pattern interrupts the white noise, causing a low-frequency tonal signal of sharply rising and falling pulses. Complaints of turbine noise are in regard to the pattern of the tonal signal more than the white noise generated by wind turbines. Some studies have shown that this tonal signal also occurs in the infrasound range, typically about 0.75 Hz, 1.5 Hz, 2.25 Hz, 3.0 Hz, and so on. At this frequency these pulses may be felt or sensed more than heard by the ears.

Tip-speed ratio ($\lambda$) is the ratio between the tangential speed of the rotor blade tip and the actual wind velocity. This is expressed by the following formula:

$$\lambda = \frac{\text{Rotor tip} - \text{speed}}{\text{Wind velocity}}$$

The tip-speed can also be calculated as follows:

$$\lambda = \frac{\omega R}{v}$$

Where $\omega$ is the rotor rotational speed in radians/second, R is the rotor radius in meters and v is the wind velocity.

The tip-speed ratio is an indicator of the efficiency of the turbine. The power coefficient (Cp) is a quantity that expresses the fraction of power in the wind that is being extracted by the turbine.

$$Cp = \frac{P_E}{P_W}$$

Where $P_E$ is the total energy extracted by a rotor and $P_W$ is the total power in a column of wind, of a diameter equal to the rotor diameter.

A fluid-power coefficient (Cp) is a function of the power generated by the turbine and the total power available in the column of fluid, the diameter of the rotor plane and the velocity of the fluid. The efficiency of a mechanical generator is less than 100%; therefore, measurements studied are appropriate relative measurements and do not predict the absolute power coefficient of any of the rotors tested and mentioned herein.

The yaw axis of a delta wing is stabilized through the backward sweep of the wings. The swept planform, when yawed out of the relative wind, creates more lift on the advancing wing and also more drag, and thus the advancing wing slows until equilibrium between the two wings is achieved. In other words, if one wing advances ahead of the other, it presents more area to the wind and causes more drag on that side. This causes the advancing wing to go slower, relative to the wind, and to fall back. The wing is at equilibrium when the aircraft is traveling straight into the relative wind, and both wings present the same amount of area to the wind.

The term 'small wind turbine' refers to wind turbines that produce energy in the range of 1 kilowatt or less. Small wind turbines are commonly self-yawing. Small wind turbines do not need motors to yaw the turbine into the wind.

A need exits for a fluid turbine rotor blade that provides increased rotor tip speed, reduced noise due to tip and trailing-edge vortices and tower signature, and reduced blade loading.

SUMMARY

Disclosed herein is a fluid turbine having a rotor with a rotor blade tip that interacts with high speed flow generated over the lift surface of a delta-wing diffuser. The delta-wing diffuser is a semi-annular delta-airfoil that occupies between 10% and 50% of the rotor swept area of a fluid turbine. The semi-annular delta-airfoil has a relatively long airfoil chord in the center and relatively shorter chord lengths at the delta-wing tips. The chord length is proportional to the lift over the airfoil and therefore proportional to the increase of mass flow through the rotor plane. As a rotor blade rotates and passes the semi-annular delta-airfoil, the rotor blade encounters a gradually increasing mass flow until it passes the center of the semi-annular delta-airfoil wherein the rotor blade encounters a gradually decreasing mass flow until it reaches the ambient mass flow in the region of the rotor plane unaffected by the semi-annular delta-airfoil. Wind shear is mitigated to the greatest extent at the bottommost portion of the rotor plane, where the wind is slowest; and to a lesser extent at the sides of the rotor plane, where wind velocity transitions between the higher velocity wind at the upper region of the rotor plane and the lower velocity wind at the bottom of the rotor plane.

The semi-annular delta-airfoil is self-aligning and obviates the need for a tail fin on turbines in the small-wind turbine scale. On larger scale turbines the semi-annular delta-airfoil assists motorized yaw systems. Winglets on the semi-annular delta-airfoil further assist in yawing the turbine into the wind by creating relatively greater drag on a windward side of the semi-annular delta-airfoil than on the leeward side.

A dual tip on each rotor blade is designed to take advantage of a high rotor-thrust coefficient, providing reduced coefficient of pressure in the rotor wake and a high-flow stream for increased mixing of rotor-wake flow with bypass flow at the exit plane of the rotor. The rotor blade tip is designed to improve rotor tip speed and also to increase the beneficial interaction between a semi-annular delta-airfoil and a rotor blade by providing an increased surface area in the region of increased mass flow over the lift side of the semi-annular delta-airfoil.

The fluid power coefficient (Cp) as a function of wake velocity ratio and thrust coefficient (Ct) may be increased because of the low exit-plane pressure coefficient that allows for a relatively higher rotor-thrust coefficient. The rotor design may take advantage of a highly cambered rotor shaft, designed for a greater Cp without stalling as it would without the dual winglet in combination with a semi-annular delta-airfoil.

A ringed airfoil surrounding a rotor swept area increases the mass flow through the rotor plane. This increased mass flow must be returned to ambient fluid stream flow rates in order to prevent diffuser stall. A diffuser segment that occupies less-than-entire rotor swept area creates two wake flow conditions. One portion of the rotor wake is similar to an open rotor turbine, the remaining portion flows over the diffuser and has a lower energy flow downstream of the rotor than that of the open rotor fluid stream. As the two wake streams mix, the rotor wake will return to ambient flow conditions with sufficient rapidity to avoid diffuser stall. Diffuser airfoil cross sections that occupy only a portion of a rotor plane may be designed with considerably higher camber and, therefore, higher lift coefficients than those designed to occupy the entire rotor swept area. The relatively higher lift coefficient over the semi-annular delta-airfoil increases tip-speed ratio for any rotor. A rotor without a winglet experiences an increase in tip-speed ratio between 12% and 18% whereas a rotor with a winglet designed to interact with the region of increased mass flow over a semi-shroud airfoil experiences an increase in tip-speed ratio that is between 15% and 25% over that of the same rotor without a semi-annular delta-airfoil.

One skilled in the art understands the importance of tip clearance in regards to shrouded turbines. The gap between the rotor blade tip and the turbine shroud is referred to as tip clearance, or tip gap. Smaller tip clearance is associated with increased effect of the shroud on the rotor. It is possible to have a larger tip clearance at the ends of the semi-annular delta-airfoil than at the center. The aerodynamic effect on the rotor tip, at the tip regions of the semi-annular delta-airfoil guides the rotor tip into alignment with the semi-annular delta-airfoil. The delta wing design of the semi-annular delta-airfoil further augments this gradual increase and decrease in the additional mass flow effect on the rotor; as the airfoils with shorter chord and camber length at the tips of the semi-annular delta-airfoil have a lesser effect than the center airfoil which has relatively longer chord and camber lengths and therefore greater increase in mass flow.

One skilled in the art understands that by controlling chord length, camber and angle of attack of the airfoil cross sections of a semi-annular delta-airfoil, the mass flow through the rotor plane may be controlled with varying volume about the radial sweep of the rotor. In this manner it is possible to control variations in blade loading about the rotor swept path. Even blade loading about the rotor swept area may mitigate blade fatigue over the life of the rotor.

Disclosed herein is an apparatus having a blade tip design that both increases performance in open fluid flow and also increases the performance of a rotor-blade and semi-annular delta-airfoil interaction. As a rotor blade rotates within a diffuser, the blade tip interacts with an area of increased mass flow. Increased rotor-blade surface area in the region of increased mass flow increases rotor-blade tip speed. That same rotor-blade surface area is also designed to improve the performance of the rotor blade in open-rotor turbine conditions. Therefore, the same rotor blade performs with significantly increased rotor-tip speed and significantly increased coefficient of power in both a diffuser-augmented environment and an open-rotor environment.

As understood by one skilled in the art, the aerodynamic principles of the present disclosure are not restricted to a specific fluid, and may apply to any fluid, defined as any liquid, gas, water or air or a combination thereof. In other words, the aerodynamic principles of a dual-tip wind turbine rotor blade and a semi-annular delta-airfoil apply to hydrodynamic principles in a dual-tip water turbine rotor blade with a semi-annular delta-hydrofoil.

BRIEF DESCRIPTION OF THE DRAWINGS

The following brief description is intended to describe and not limit the disclosure. Example embodiments are further described with reference to the appended figures. The features and combinations of features described and illustrated below can be organized differently to result in embodiments which remain within the spirit and scope of the present disclosure. To assist those of ordinary skill in the art in making and using the disclosed systems, assemblies and methods, reference is made to the appended figures, wherein.

DETAILED DESCRIPTION

The disclosed embodiments are examples of which are not intended to limit the present disclosure.

A more complete understanding of the components, processes, and apparatuses disclosed herein can be obtained by reference to the accompanying figures. These figures are intended to demonstrate but not limit the present disclosure.

Figure 1:
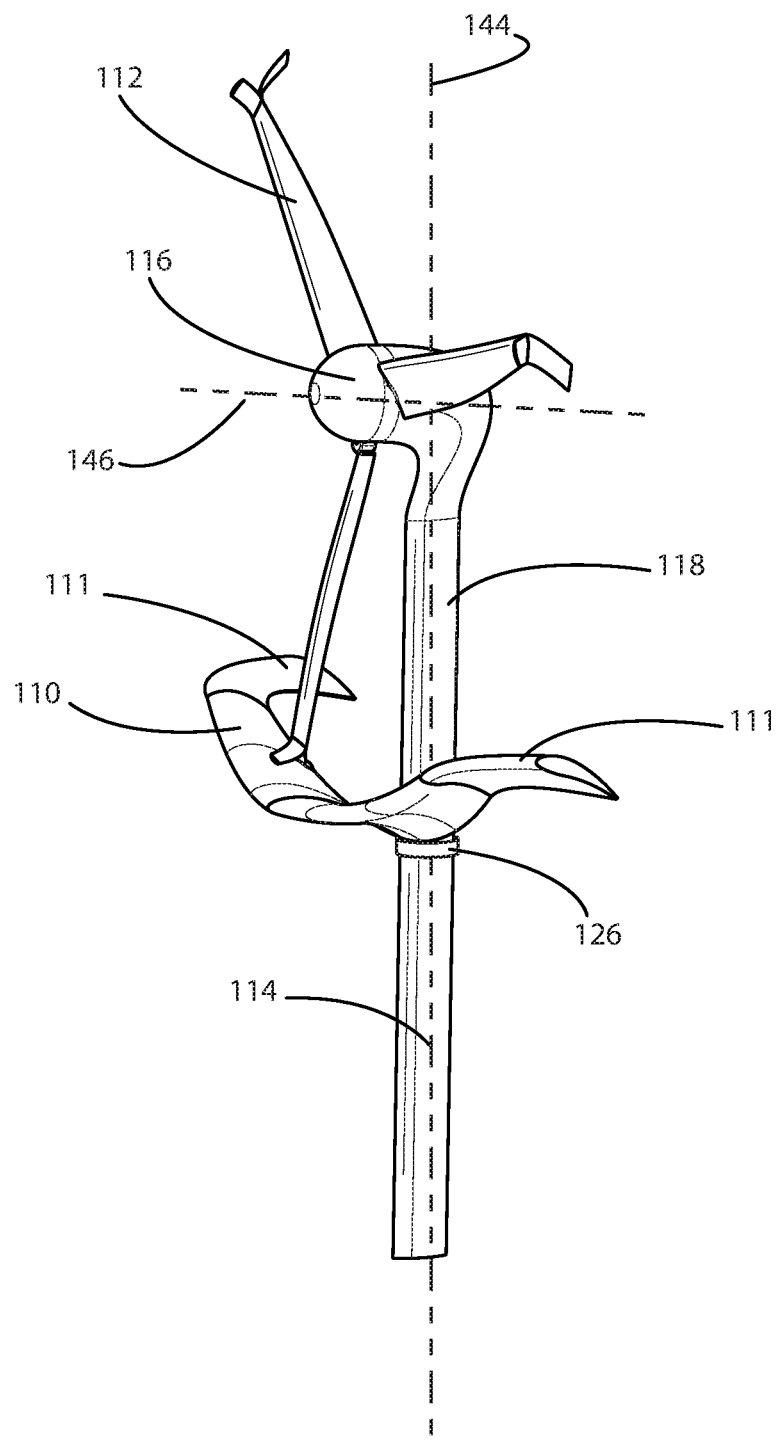
FIG. 1 is front, perspective view of the present embodiment.

FIG. 1 is a front perspective view of a rotor and semi-shroud combination of the present disclosure on a wind turbine. The wind turbine has a tower 114 that is rotationally engaged about a vertical axis 144 with a nacelle 116 that houses electrical generation equipment. A rotor comprised of at least one rotor blade 112 is rotationally engaged about a horizontal axis 146 with the nacelle 116 and electrical generation equipment. A semi-shroud 110 is in fluid communication with the rotor blades 112 and is rotationally engaged with the tower 114 about a rotational alignment 126. The rotational alignment 126 is in turn rotationally engaged about the turbine vertical axis 144. A hollow shaft 118 is engaged with both the nacelle 116 and the semi-shroud 110. It ensures that the semi-shroud 110 rotates about the vertical axis 144 at the same rate as the nacelle 116. This is to avoid interference between the rotor blades 112 and the semi-shroud 110.

The delta-wing design of the semi-annular delta-airfoil 110 has varying airfoil cross sections. An airfoil cross section designed to produce relatively less lift at the tip than at the centers allows for a gradual introduction of the semi-shroud effect on the rotor as it approaches the center of the semi-shroud. Subsequently, a decreased effect occurs between the semi-shroud on the rotor as it leaves the proximity of the semi-shroud. One skilled in the art understands that as a rotor approaches a semi-shroud it is important to avoid interference between the rotor blade tip and the semi-shroud. Various airfoil cross sections may be designed to align the rotor blade with the semi-shroud using airflow. The semi-shroud tip 111 turns arcuately downwind of the span-wise cross section of the semi-shroud. These shroud tips 111 provide additional alignment surfaces. A swept-back wing surface such as those of shroud tips 111 produce relatively less drag when aligned with the wind than when out of alignment of the wind. The semi-shroud tips 111 effectively move the turbine rudder to a location that is outside of the rotor wake.

Figure 2:
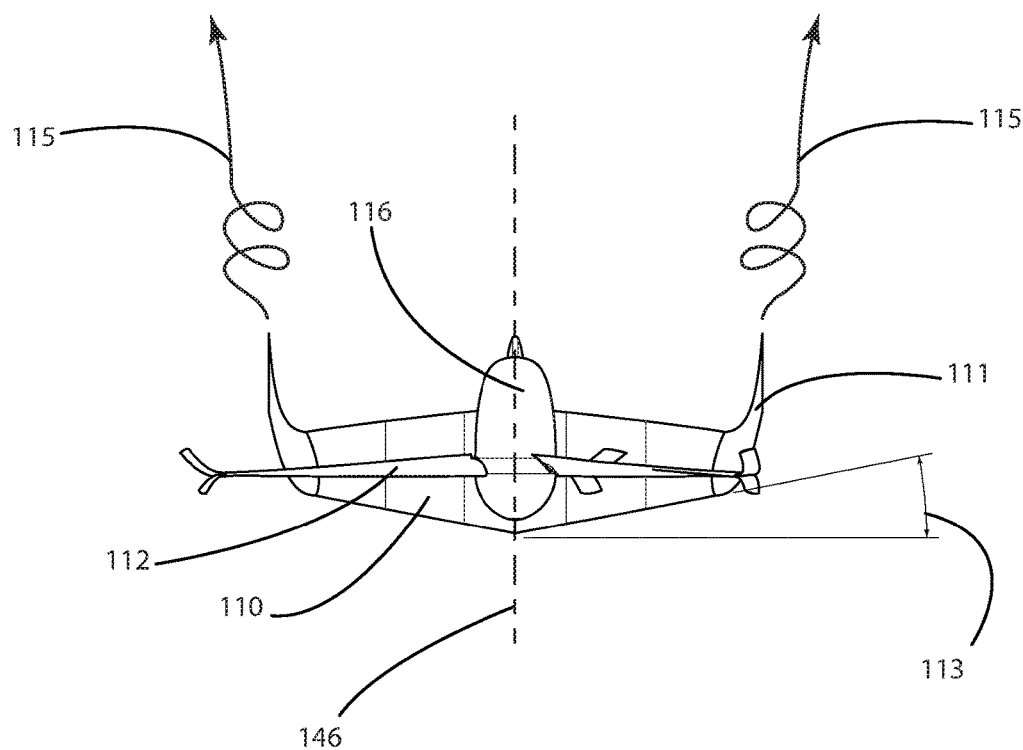
FIG. 2 is a top, orthographic view of a dual-tip rotor of the present embodiment in combination with a semi-shroud.

FIG. 2 is an orthographic top view of the present embodiment. The nacelle 116 is rotationally engaged with the rotor 112. The semi-annular delta-airfoil 110 has a leading edge that is at an angle 113 with respect to a line that is perpendicular to the nacelle central axis 146. The angle 113 is between 10° and 35°. A delta wing experiences greater lift and drag on a wing that is upwind of its opposing wing therefore a delta wing will self-align into oncoming wind. The semi-annular delta-airfoil wing-tips 111 are designed to further increase the drag on an upwind side of the semi-annular delta-airfoil thus augmenting the ability of the delta-wing design to align the turbine into the wind. The semi-shroud wing tips 111 are designed to create vortices 115 that project outward as they flow downwind thus having a minimal effect on the rotor wake.

Figure 3:
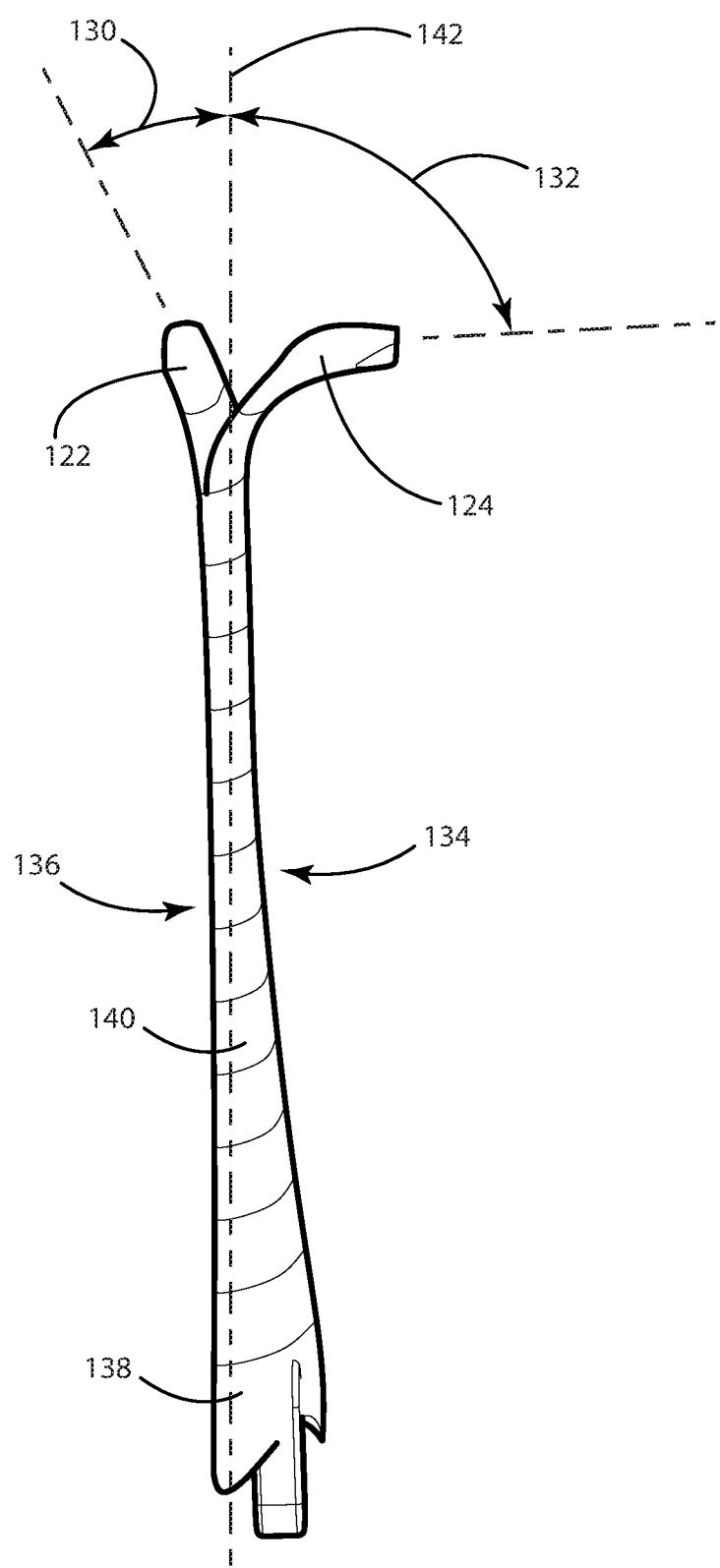
FIG. 3 is front, perspective view of a rotor blade of the present embodiment.

FIG. 3 depicts a rotor 112 with a dual winglet. The rotor's primary structure, the rotor shaft 140 extends from the root 138 to the dual tip along a centerline 142. The shaft 140 has a pressure surface 136 and a lift surface 134 according to the shape of the airfoil cross section. The rotor blade 112 further comprises a pressure-surface winglet 122 and a lift-surface winglet 124. The pressure-surface winglet 122 turns from the pressure surface 136 to an angle 130 between 15° and 35° with respect to a centerline 142. The lift-surface winglet 132 turns from the lift-surface 134 at angle 132 that is between 70° and 120° with respect to centerline 142.

Figure 4:
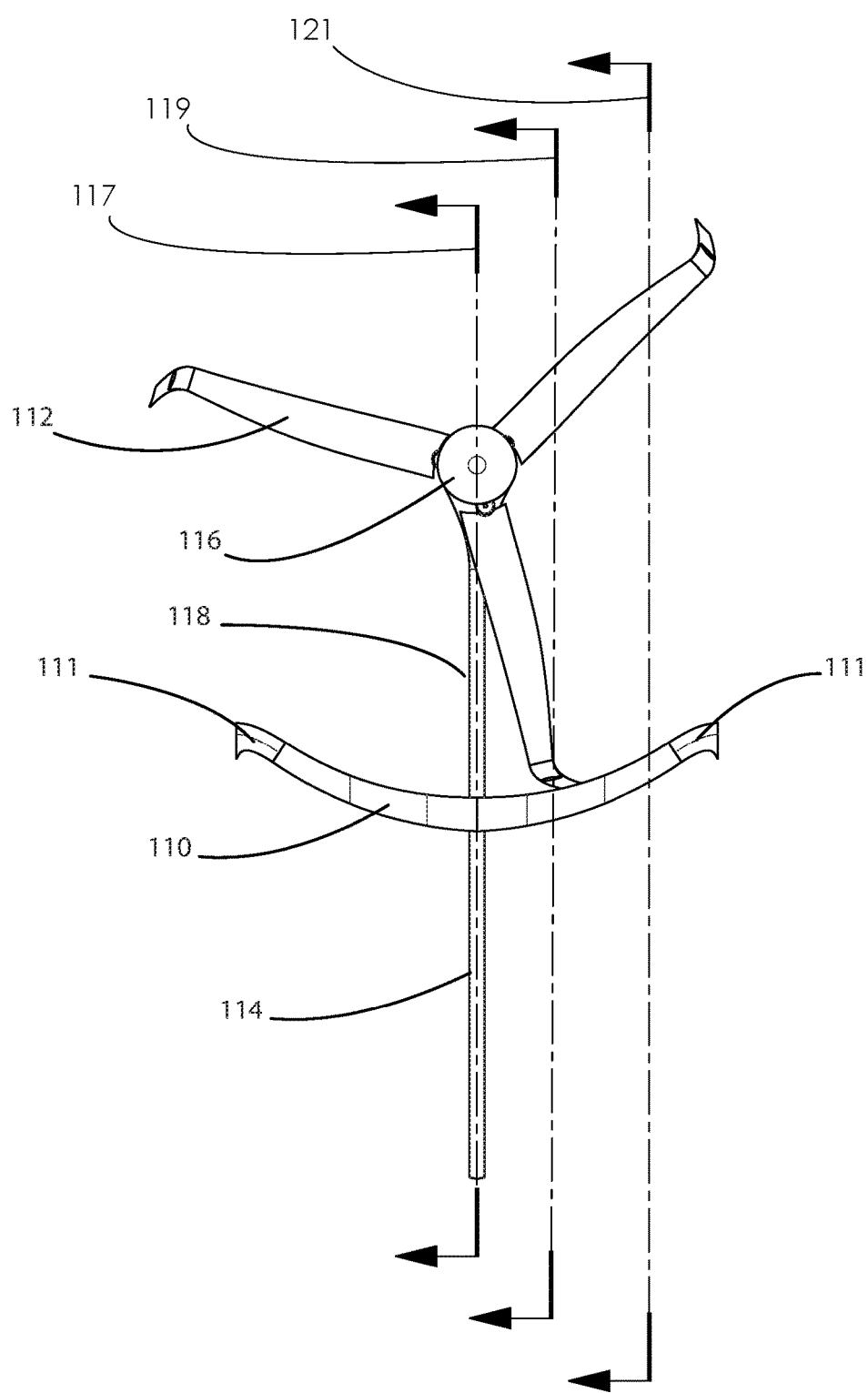
FIG. 4 is a front, orthographic view of a dual-tip rotor of the present embodiment in combination with a semi-shroud, showing cross section planes described in greater detail in the following figures.
Figure 5:
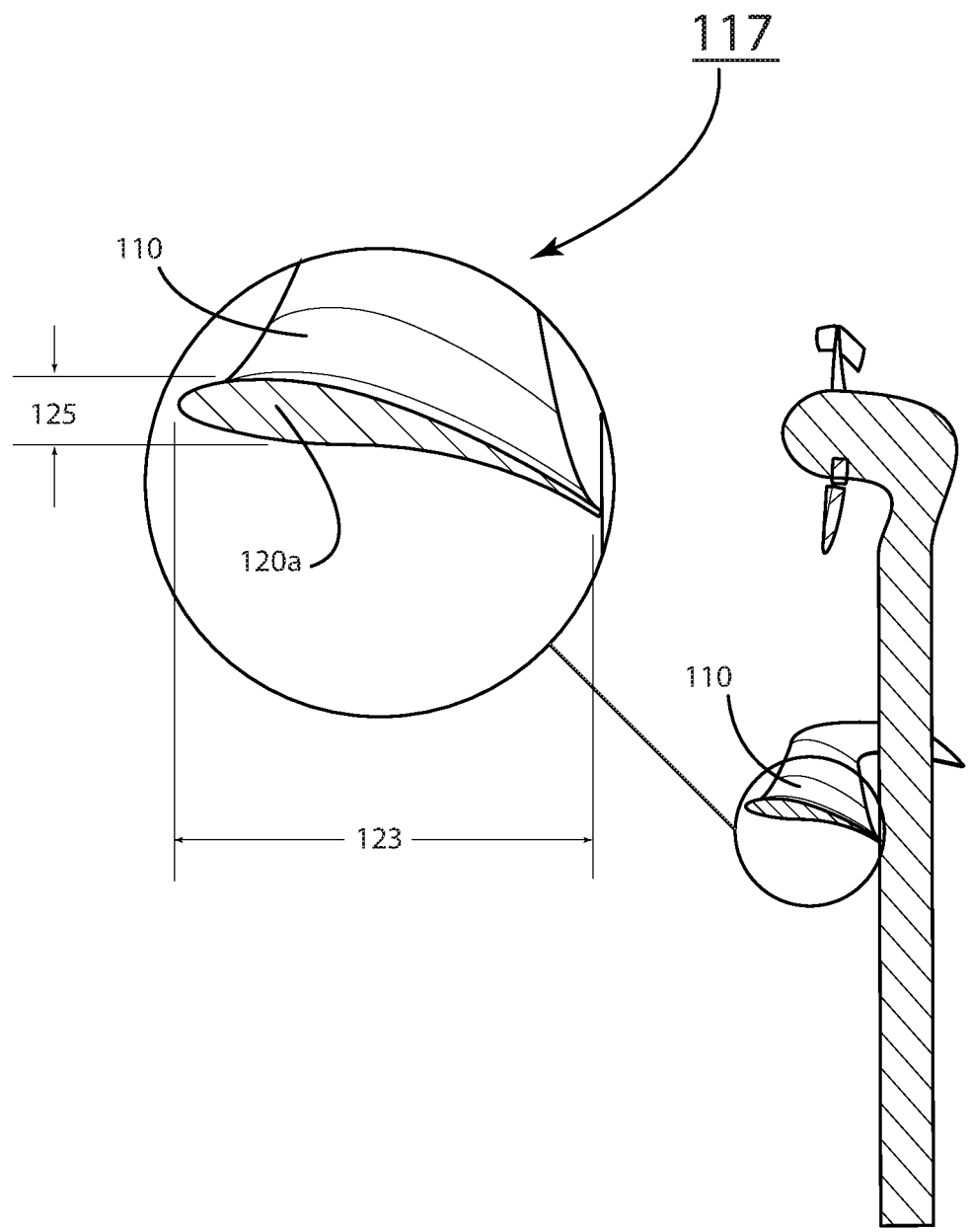
FIG. 5 is a detail, section view depicting a cross sectional cut of FIG. 4.
Figure 6:
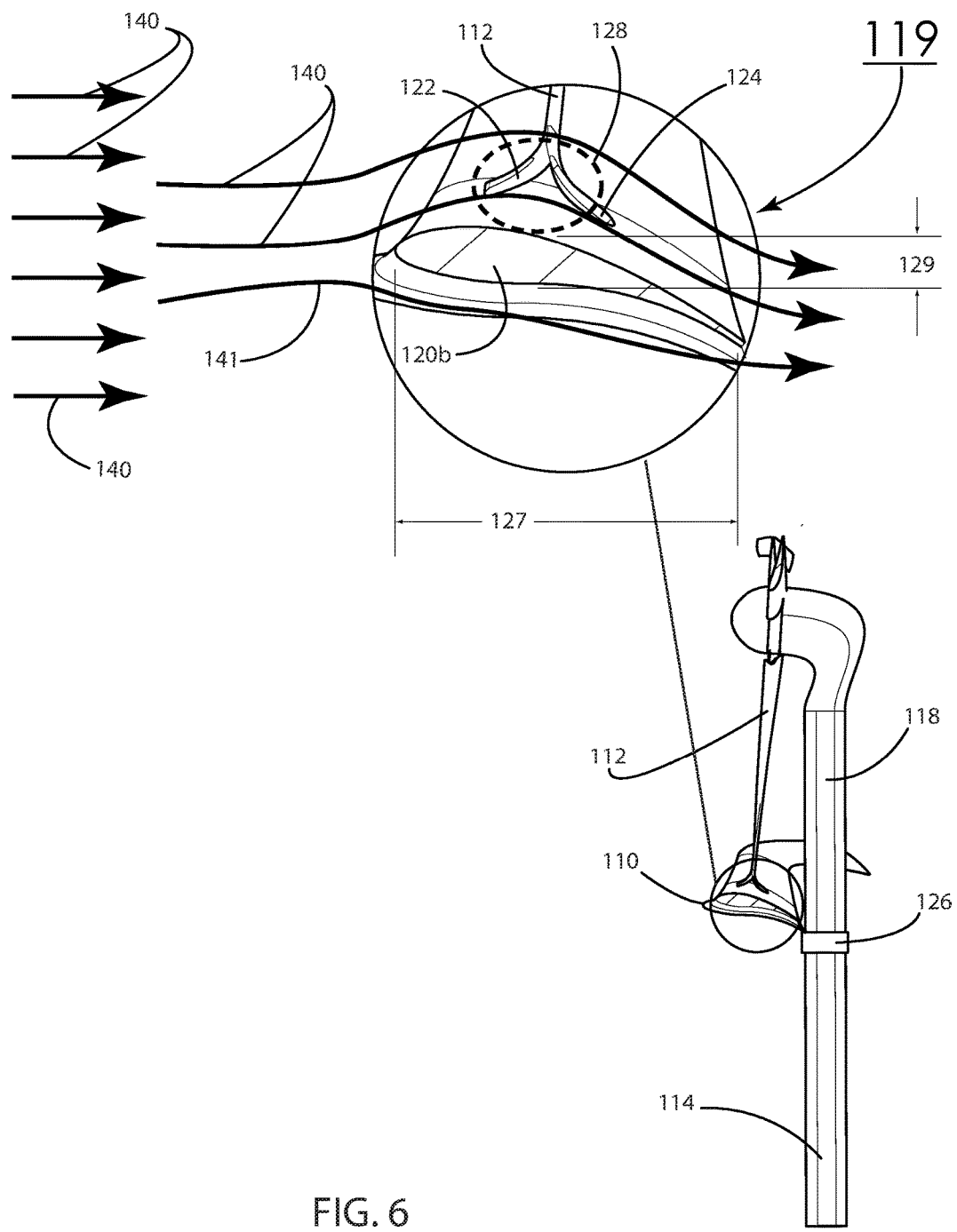
FIG. 6 is a detail, section view depicting a cross sectional cut of FIG. 4.
Figure 7:
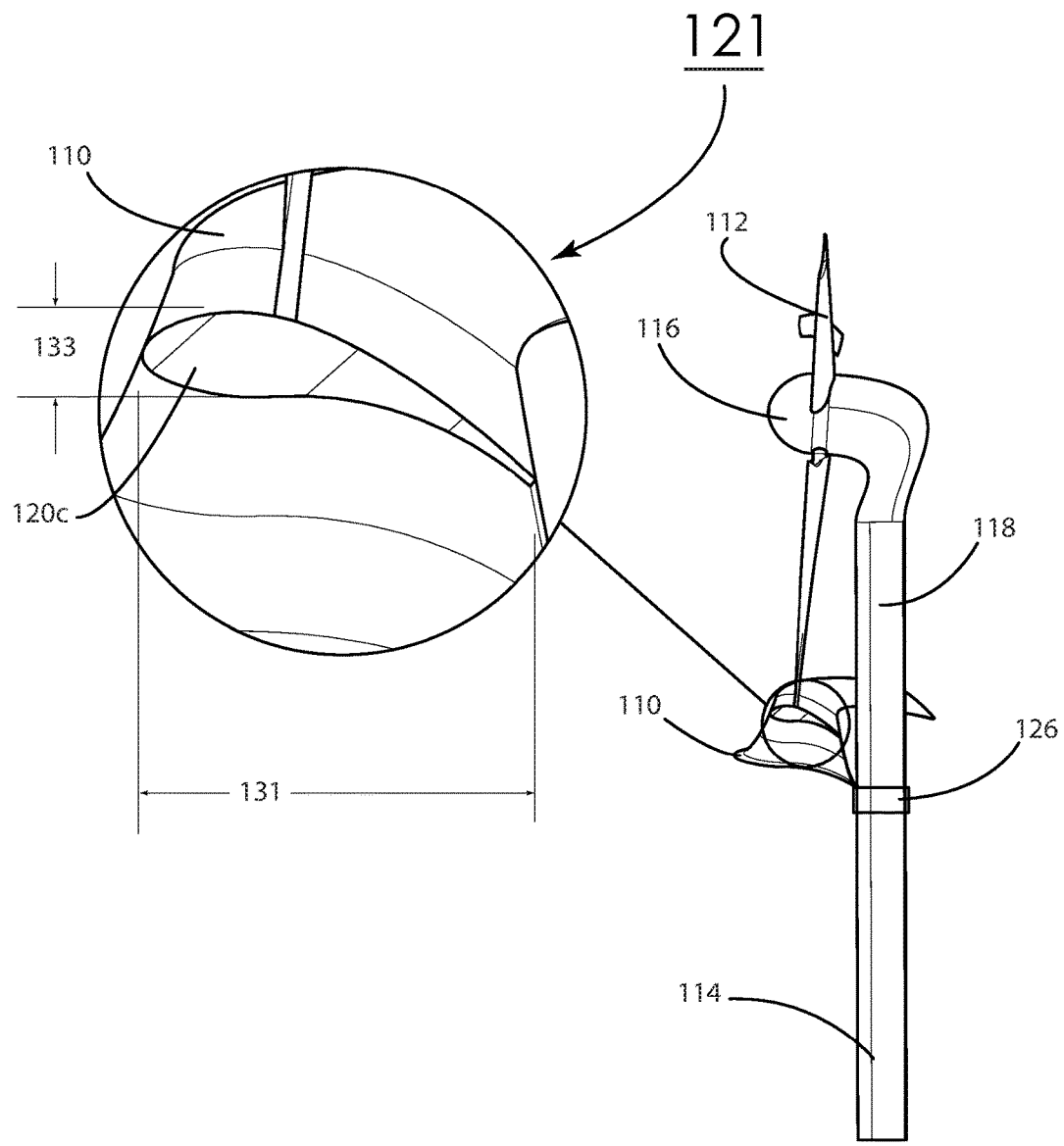
FIG. 7 is a detail, section view depicting a cross sectional cut of FIG. 4.

FIG. 4 presents a front orthographic view of a rotor and semi-shroud combination of the present disclosure with three cross section lines that are further defined in FIGS. 5, 6 and 7. A wind turbine has a tower 114 with a nacelle 116 that houses electrical generation equipment. A rotor comprised of at least one rotor blade 112 is rotationally engaged with the nacelle 116 and enclosed electrical generation equipment. A semi-shroud 110 is in fluid communication with the rotor blades 112 and is rotationally engaged with the tower 114 about a rotational alignment means. A hollow shaft 118 is engaged with both the nacelle 116 and the semi-shroud 110 to ensure that the semi-shroud 110 rotates about the vertical axis at the same rate as the nacelle 116 and to avoid interference between the rotor blades 112 and the semi-shroud 110.

A center cross section line 117 cuts the apparatus through a vertical plane that is located at the center of the apparatus. A mid cross section line 119 cuts the apparatus midway between the center cross section line and the semi-shroud tip 111. A third cross section line 121 cuts the apparatus proximal to the semi-shroud tip 111.

The illustration in FIG. 5 depicts the cross sectional view at the center cross section line 117 (FIG. 4). The airfoil cross section 120a of the semi-shroud 110 is shown to have a chord length 123 and a camber 125. The ratio of chord length (X) to camber (Y) is:

$$\frac{16\langle X\rangle 20}{2\langle Y\rangle 4}$$

In other embodiments the ratio of chord to camber is approximately:

$$18/3$$

FIG. 6 depicts a cross sectional image along the mid cross section line 119 of FIG. 4. The detailed cross section 119 depicts the airfoil cross section 120b and the ratio of the chord length 127 to the camber 129 as well as to the fluid interaction between the rotor blade 112 and the semi-shroud 110.

The following components and associated reference numbers are shown for reference. A wind turbine has a tower 114 with a nacelle 116 that houses electrical generation equipment. A rotor comprised of at least one rotor blade 112 is rotationally engaged with the nacelle 116 and enclosed electrical generation equipment. A semi-shroud 110 is in fluid communication with the rotor blades 112 and is rotationally engaged with the tower 114 about a rotational alignment means 126. A hollow shaft 118 is engaged with both the nacelle 116 and the semi-shroud 110 and ensures that the semi-shroud 110 rotates about the vertical axis at the same rate as the nacelle 116 to avoid interference between the rotor blades 112 and the semi-shroud 110.

Referring to the detailed cross sectional view 119, the fluid interaction between the rotor blade 112 and in particular the upwind winglet 122 and the downwind winglet 124 is illustrated. Wind approaching a turbine 140 encounters an airfoil cross section 120b of a semi-shroud 110 and divides into a higher velocity stream over the lift surface of the airfoil and a lower velocity, higher pressure flow 141 over the pressure surface of the airfoil. The region depicted by dashed line 128 is a region of increased lift that generates the region of relatively greater mass flow through the rotor plane. The increased mass flow provides increased energy that may be extracted by the rotor as it surrounds the tip of the rotor blade 112, thus increasing the blade tip-speed and the coefficient of power. The upwind winglet 122 and the downwind winglet 124 pass through the region of increased lift 128 and provide relatively greater rotor blade surface area within this region 128 than a rotor without winglets. The interaction between the relatively greater surface area of the winglets 122/124 and the region of increased lift 128 provides a greater rotor tip speed ratio than a comparable open rotor or a conventional rotor without a shroud or semi-shroud.

FIG. 6 depicts a cross sectional view at a mid-cross section line 119. The airfoil cross section 120b of the semi-shroud 110 is shown to have a chord length 127 and a camber 129. The ratio of chord length (X) to camber (Y) is:

$$\frac{17\langle X\rangle 21}{2\langle Y\rangle 4}$$

In other embodiments the ratio of chord to camber is approximately:

$$19/3$$

The chord length 127 (FIG. 6) is substantially shorter than the chord length 123 (FIG. 5).

FIG. 7 shows the cross sectional view at the semi-shroud wing tip cross section line 121. The airfoil cross section 120c of the semi-shroud 110 is shown to have a chord length 131 and a camber 133. The ratio of chord length (X) to camber (Y) is:

$$\frac{16\langle X\rangle 20}{3\langle Y\rangle 5}$$

In other embodiments the ratio of chord to camber is approximately:

18/4

The chord length 131 (FIG. 7) is substantially shorter than the chord length 127 (FIG. 6).

The present disclosure has been described with reference to example embodiments. Modifications and alterations will occur to others upon reading and understanding the preceding detailed description. It is intended that the present disclosure be construed as including all such modifications and alterations insofar as they come within the scope of the appended claims or the equivalents thereof.

Although the systems and methods of the present disclosure have been described with reference to example embodiments thereof, the present disclosure is not limited to such example embodiments and or implementations. These drawings and the specification shall be interpreted as illustrative and not limiting. Additional modifications, changes, and substitutions are intended in the foregoing disclosure. The appended claims shall be construed broadly and in a manner consistent with the scope of the disclosure.

The invention claimed is:

1. A rotor blade for a fluid turbine in combination with a semi-annular delta-airfoil comprising:
   a rotor blade for a fluid turbine comprising:
   an upwind direction; and
   a downwind direction; and
   a root region; and
   a tip region; and
   a long axis extending from said root region to said tip region; and
   a body extending along said long axis, from said root region to said tip region; and
   said body further comprising an airfoil cross section, said airfoil cross section comprising:
      a leading edge; and
      a trailing edge; and
      a lift surface; and
      a pressure surface; and
   said tip region comprising a first winglet and a second winglet; and
   said first winglet extending arcuately away from said lift surface in said downwind direction; and
   said leading edge transitioning along said first winglet toward said trailing edge; and
   said second winglet extending arcuately away from said pressure surface in said upwind direction; and
   said leading edge transitioning along said second winglet toward said trailing edge; said rotor blade rotationally engaged with said fluid turbine wherein said fluid turbine has a central axis about which at least one said rotor blade rotates, providing a rotor swept area; and
   said rotor swept area in fluid communication with a semi-annular delta-airfoil comprising:
      an airfoil cross section; having an upwind direction; and
      a downwind direction; and
      a lift surface facing said central axis; and
      a pressure surface facing radially away from said central axis; and
      said airfoil cross section at the center of the semi-annular delta-airfoil having a leading edge forward of airfoil cross sections proximal to wing tips of said semi-annular delta-airfoil; and
   said semi-annular delta-airfoil in fluid communication with said at least one rotor blade, proximal to the perimeter of said rotor swept area located at the lower region of said rotor swept area; wherein
   the airfoil cross sections of said semi-annular delta-airfoil forming a delta-wing configuration; and the rotor swept area is in fluid communication with the lift surface of said semi-annular delta-airfoil in the lower region of the rotor swept area.

2. The rotor blade in combination with the semi-annular delta-airfoil of claim 1 wherein said second winglet turns arcuately from said pressure surface at an angle between 15° and 35°.

3. The rotor blade in combination with the semi-annular delta-airfoil of claim 1 wherein said first winglet turns arcuately from said lift surface at an angle between 70° and 120°.

4. The rotor blade in combination with the semi-annular delta-airfoil of claim 1 further comprising:
   winglets at the wing tips of said semi-annular delta-airfoil; and
   said winglets curving arcuately down wind of the leading edge of the semi-annular delta-airfoil; wherein
   said semi-annular delta-airfoil winglets provide greater drag over an upwind side of said semi-annular delta-airfoil, thus self-aligning said semi-annular delta-airfoil into the wind.

5. The rotor blade in combination with the semi-annular delta-airfoil of claim 1 further comprising:
   an angle formed by a first plane that is vertical to and collinear with the leading edge of said semi-annular delta-airfoil and a second plane that is vertical and perpendicular to said turbine axis; and
   said angle being between 10° and 35°.

\* \* \* \* \*